(12) United States Patent
Nienhaus

(10) Patent No.: US 7,281,434 B2
(45) Date of Patent: Oct. 16, 2007

(54) SERVICE LIFE SENSOR DEVICE

(75) Inventor: Karl Nienhaus, Hauset (BE)

(73) Assignee: Thiele GmbH & Co. KG, Iserlohn (DE)

( * ) Notice: Subject to any disclaimer, the term of this patent is extended or adjusted under 35 U.S.C. 154(b) by 164 days.

(21) Appl. No.: 11/177,018

(22) Filed: Jul. 8, 2005

(65) Prior Publication Data

US 2005/0241402 A1     Nov. 3, 2005

Related U.S. Application Data

(63) Continuation-in-part of application No. PCT/DE04/00606, filed on Mar. 24, 2004.

(30) Foreign Application Priority Data

| Mar. 27, 2003 | (DE) | 103 13 726 |
| Nov. 13, 2003 | (DE) | 103 52 959 |
| Aug. 19, 2004 | (DE) | 10 2004 040 407 |

(51) Int. Cl.
    *G01B 5/30*     (2006.01)
(52) U.S. Cl. .................... 73/828; 73/577; 73/579; 73/582; 73/781; 73/786; 73/788; 73/789; 73/826
(58) Field of Classification Search ............. 73/577, 73/579, 582, 781, 786, 789, 828
    See application file for complete search history.

(56) References Cited

U.S. PATENT DOCUMENTS

| 4,336,595 A | 6/1982 | Adams et al. |
| 4,480,480 A | 11/1984 | Scott et al. |
| 4,604,706 A * | 8/1986 | Fisher et al. ............... 702/15 |
| 5,421,204 A | 6/1995 | Svaty, Jr. |
| 5,507,188 A | 4/1996 | Svaty, Jr. |
| 6,453,247 B1 * | 9/2002 | Hunaidi ............... 702/51 |

(Continued)

FOREIGN PATENT DOCUMENTS

DE      39 30 314 A     3/1990

(Continued)

OTHER PUBLICATIONS

Michel J: "Dehnungsmessung mit funkabfragbaren OFW-Resonatoren", Technisches Messen TM, R. Oldenbourg Verlag, Munich, DE, vol. 62, No. 9, Sep. 1, 1995, pp. 342-345, XP000527993, ISSN: 0171-8096.

*Primary Examiner*—Edward Lefkowitz
*Assistant Examiner*—Freddie Kirkland, III
(74) *Attorney, Agent, or Firm*—Henry M. Feiereisen; Ursula B. Day

(57) ABSTRACT

A device for monitoring the service life of a machine-technical installation includes a sensor module and at least a measuring sensor for detecting stresses and expansions from a structural component of the machine-technical installation, a microcontroller, an antenna arrangement and a current source; the sensor module being in bi-directional connection with a data processing unit and having an antenna arrangement integrated therein, the antenna arrangement including a low-frequency antenna by means of which the sensor module is turned on and off and a high-frequency antenna for sending and receiving high frequency signals and wherein the sensor module can transition from an operating mode into a stand-by mode for energy efficiency and is reactivated through a signal from a detector element.

9 Claims, 4 Drawing Sheets

U.S. PATENT DOCUMENTS 6,480,792 B1 * 11/2002 Prendergast ................ 702/42

FOREIGN PATENT DOCUMENTS

| DE | 195 04 050 A | 8/1996 |
| DE | 196 45 613 A | 9/1997 |
| DE | 100 36 014 A | 2/2002 |
| DE | 2 387 912 A | 10/2003 |

* cited by examiner

SERVICE LIFE SENSOR DEVICE

CROSS-REFERENCES TO RELATED APPLICATIONS

This application is a continuation-in-part of prior filed PCT International application no. PCT/DE2004/000606, filed Mar. 24, 2004, which designated the United States and on which priority is claimed under 35 U.S.C. §120, the disclosure of which is hereby incorporated by reference, and which claims the priorities of German Patent Applications, Serial Nos. 103 13 726.2, filed Mar. 27, 2003, and 103 52 959.4, filed Nov. 13, 2003, pursuant to 35 U.S.C. 119(a)-(d), the disclosure of which is incorporated herein by reference.

This application also claims the priority of German Patent Application, Serial No. 10 2004 040 407.0, filed Aug. 19, 2004, pursuant to 35 U.S.C. 119(a)-(d), the disclosure of which is incorporated herein by reference.

BACKGROUND OF THE INVENTION

The present invention relates to a service life sensor device for determining the material stress in machine-technical installations, and in particular, a service life sensor device including a sensor module for detecting tensions and expansions in structural components of these installations to thereby determine the serviceable life of the installation.

The prognosis of the serviceable life of machine-technical installations and structural components thereof is highly important, especially as it relates to those installations that are built to tolerate vibrations and that are under long periods of operation and are therefore prone to fatigue. Thus, determination of the service life is very important for securing continued flawless operation of the installation and their components and to avoid and prevent damage to the installation.

In this context, it is known in the prior art to attach sensors to machine-technical components in order to determine strain or damage to the part and to determine its upper limit load amount.

Nothing in the following discussion of the state of the art is to be construed as an admission of prior art.

The known sensors consist in general of expansion measuring strips, which must be fastened to the installation component and which must be coupled to a sorting-/evaluation unit and to electric current. However, the cabling lay-out of these units is generally impractical and feasible in only few applications to monitor the structural building components and such measuring operations are very labor-intensive. In addition, measuring units of this type take up an inordinate amount of space due to their complexity in supplying necessary electric current, providing data interpretation units and measuring sensors, such that taking continuous measurements with these monitoring devices are only feasible in a limited number of applications due to the afore-stated constraints. Therefore, utilization of this type of sensors is generally associated with high expenses and considered impractical in their operation.

The prior art as disclosed in U.S. Pat. No. 5,421,204 includes a method and device for determining the useful life of technical structures that are subject to fatigue, or buildings such as bridges and similar. This prior art device comprises a sensor which includes expansion measuring strips for collecting data on the tensions and expansions in the structural parts as well as a data storage, a control device and a data interpretation unit, a transmitter, a receiver, an antenna arrangement and a battery as a current source. These components are assembled into a unit for placement in a fixed position at the installation component to be monitored. From the collected data of the measured expansions and tensions and the determination of the stress loads by means of applicable calculating methods, a computation of the damage to the installation can be realized.

The foregoing method of measuring, collecting and determining data is however cumbersome and since the device is operated based on batteries, its operational readiness is dependent on the capacity of the battery.

It would therefore be desirable and advantageous to obviate prior art shortcomings and to provide an improved device for determining the serviceable life of machine-technical installations.

SUMMARY OF THE INVENTION

According to one aspect of the present invention, a device for determining the serviceable life of a machine-technical installation comprises a sensor module to be disposed on a structural component of an installation wherein the sensor module includes at least one measuring sensor for collecting stress- and tension data from the installation, a microcontroller and an antenna arrangement as well as a current source and wherein the sensor module, which is bi-directionally connected to a data processing unit, includes a low frequency antenna and a high-frequency both integrated into the sensor module and wherein the sensor module can transition from an operational mode to a stand-by mode and a detector element is provided for reactivating the sensor module that is in standby mode.

The service life sensor device of the present invention resolves prior art problems because it is energy self-sufficient and can be remotely operated online. Furthermore, the device according to the present invention requires no complicated cable lay-out and therefore is simple to use on a variety of installations. Measurements can be taken online so that the device is not limited to a specific application and since the data measured from the structural component of the installation is taken directly online, expensive downstream measuring processes are not necessary and the so collected data is already processed by the microcontroller integrated into the sensor module. Due to its small and compact construction, the sensor module can be easily installed almost anywhere on the structural component of the installation with the stress data collected from the structural component already processed within the sensor module. The sensor device has application in a wide-variety of machine-technical installations, such as for example on conveyor chains and other installations that carry static or dynamic loads. All necessary communications in connection with the sensor device are carried out either via a low-frequency (125 kHz) antenna integrated into the sensor module or via a high frequency antenna (2.4 Gigahertz) also integrated into the sensor module.

The sensor module is bi-directionally connected with a data processing unit via a low-frequency transmitter as well as via a high frequency transmitter/receiver.

Furthermore, the sensor module according to the present invention is provided with an efficient energy control for optimal utilization of the energy supplied via the integrated continuous current source. In accordance with the present invention, the sensor module can also transition into a stand-by mode.

Another feature of the present invention is the remote control, whereby the sensor module can be turned on and off from a remote location, which is important, for example, in case where an extended interruption in the operation of the installation to be monitored has occurred. The remote function is controlled via the low-frequency transmitter and the low frequency antenna.

The low-frequency-communication channel receives its operating current from the low frequency signal of 125 kHz. That is, the sensor module can be turned on and off without reliance on the sensor module's own current supply.

In addition, the sensor module transitions itself into the stand-by mode if it detects that no measurably relevant changes have occurred in the installation component to be monitored over a certain time period. In the stand-by mode, the sensor module behaves as if were turned off and thus uses distinctly less power as compared to the normal operation mode. For reactivation of the sensor module from the standby mode, a detector element is provided for rapidly bringing the sensor module into operating mode. Preferably, a piezosensor is utilized as a detector element.

The device according to the present invention which includes an evaluation/read-out station is also cost-efficient to produce.

Further advantageous features of the sensor module according to the present invention are discussed further below in connection with a preferred embodiment of the invention.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
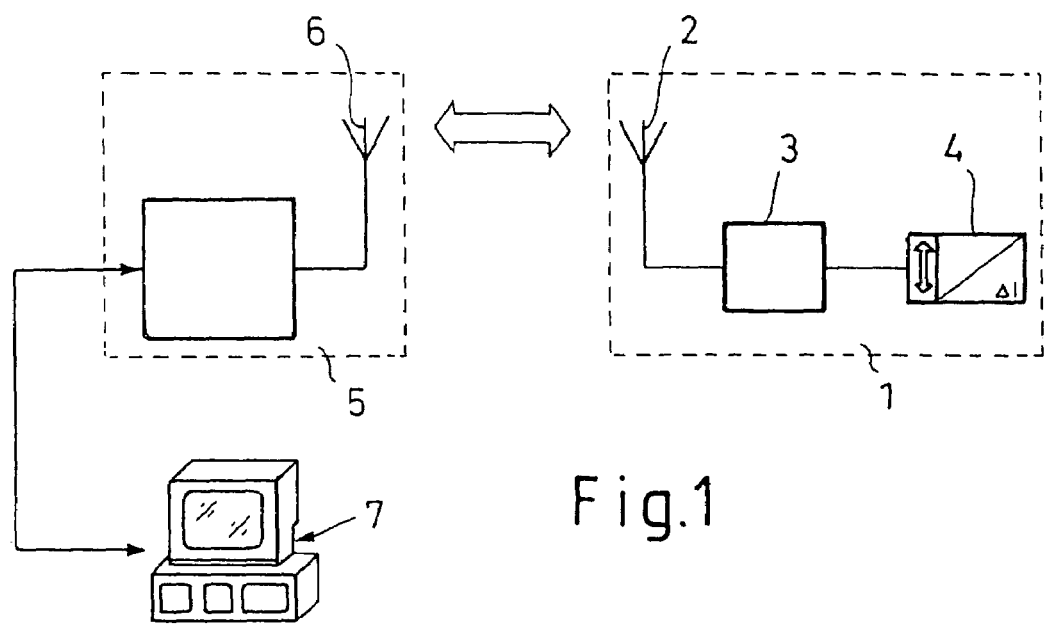
FIG. 1 is a schematic illustration of a service life sensor device for monitoring the serviceable life of an installation according to the present invention.

Throughout all the Figures, same or corresponding elements may generally indicate same reference numerals. These depicted embodiments are to be understood as illustrative of the invention and not as limiting in any way. It should also be understood that the drawings are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown in a schematic illustration, the service life sensor device according to the present invention in its principally simple form in which the device includes essentially 3 units. The sensor module 1 includes a coupling element in the form of an antenna 2, a processing unit 3 and a sensor element 4 for disposition at or in a structural component of a machine-technical installation. The sensor module 1 cooperates with a reading unit 5, which is likewise provided with an antenna 6. The reading unit 5 cooperates with an application 7 in the form of a data processing unit. The sensor module 1 is in contact with the structural component to be monitored for registering tensions from the component.

Figure 2:
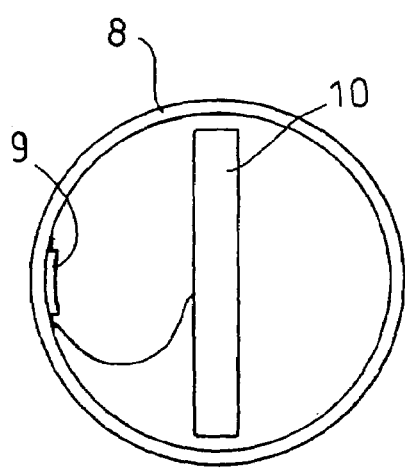
FIG. 2 is a cross section of the schematic illustration of a sensor module in an embodiment A.
Figure 3:
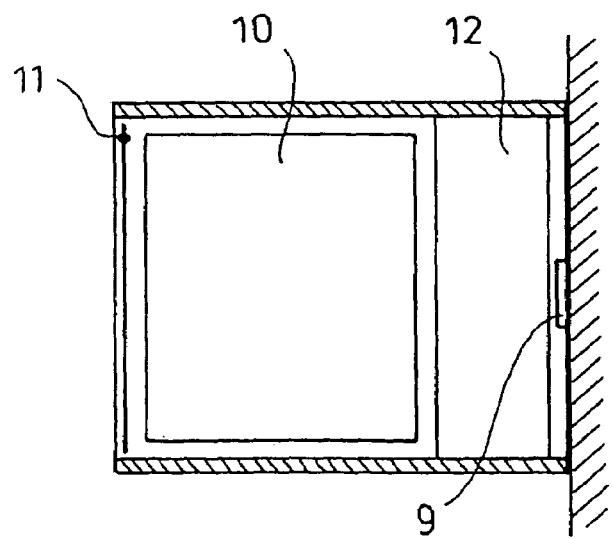
FIG. 3 is a longitudinal section of the schematic illustration of a sensor module in an embodiment B.

Two embodiments, variations A and B of a device according to the present invention are shown in FIGS. 2 and 3 respectively. In FIG. 2, the device is provided with either an expansion measuring strip (DMS) or a Surface Acoustic Wave sensor (SAW) 9 disposed at an interior wall of the sleeve 8 for measuring expansions on the structural component, whereby sleeve 8 takes up the tensions from the structural component in the form of expansions. By means of a measuring signal from the microcontroller 4 which is supported on a multilayer ceramic-module 10, the expansions from sleeve 8 are registered with the DMS or SAW 9. The multilayer ceramic module is, for example, a low temperature co-fired ceramic (LTCC). The measured expansion data so registered, is not stored in the form of single absolute values but the data is assigned a respective class, which was created by dividing the nominal load range into a series of classes. This division of the nominal load range is matched with the structural component to which sleeve 8 is connected.

By means of a suitable computing method, the data measured by the DMS or SAW 9 are processed in the microcontroller and stored in the storage of the microcontroller. This computing method, unlike other computing methods, is designed to take into account average load fluctuations. The structural component stresses are thus stored in the storage matrix as a load universe for each of the classes. The content of the storage is read out by means of wireless transmission in varying periodic intervals via the antenna 11. Energy is supplied by a battery 12.

In embodiment variation B shown in FIG. 3, the DMS or SAW 9 is shown placed directly at the structural component of the installation to be monitored. Here, the stresses from the structural component are taken up directly from the component and are not measured via the deformation of the sleeve 8.

In both embodiment variations A and B, the data transmitted via antenna 11 are collected and evaluated by reading unit 5. Functioning also as a monitoring unit, the reading unit 5 registers a possible overburdening such that a replacement of unit parts can be done in timely manner prior to eventual lack of function.

Figure 4:
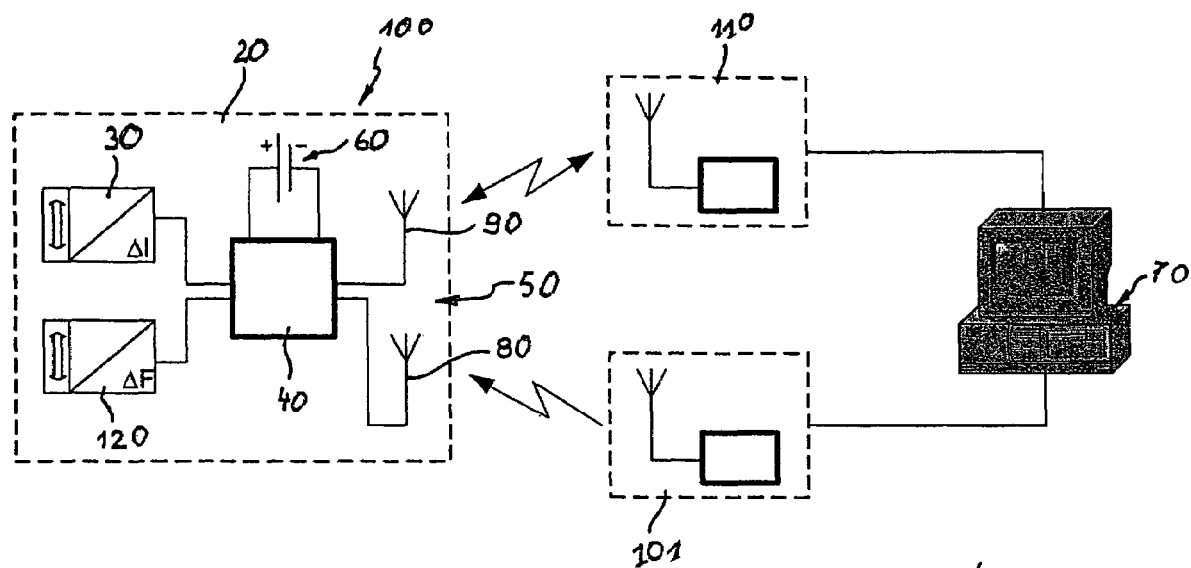
FIG. 4 is a schematic illustration of another embodiment of the service life sensor device.

In FIG. 4, a schematic illustration of another embodiment of the sensor device according to the present invention is shown, which includes a sensor module 100 for disposition at a structural component of a machine-technical installation. The sensor module 100 includes a carrier 20 and at least one measuring element 30 in the form of an expansion measuring strip for detecting expansions and tensions in a structural component, a micro controller 40, an antenna arrangement 50 and a current source 60 in the form of a battery.

As shown in FIG. 4, the sensor module 100 is in bi-directional connection with a data processing unit 70. In accordance with the present invention, the antenna arrangement 50 of the monitoring device includes a low-frequency antenna 80 integrated into the sensor module 100, as well as a high-frequency antenna 90 also integrated into the sensor module 100. The sensor module 100 can transition from an operation mode into a standby mode.

The sensor module is energy self-sufficient due to its internal current source 60 which obviates the need for a local cable connection. All necessary communication is carried out via the integrated low-frequency antenna 80 or via the high-frequency antenna 90. The transmission via low-frequency happens unidirectional, that is, the sensor module 100 can only receive, but is unable to transmit low-frequency signals. On the other hand, the transmission via the high-frequency antenna 90 is bi-directional so that the sensor module 100 can receive and transmit high-frequency signals.

The sensor module 100 is bi-directionally connected to the data processing unit 70 via the low-frequency transmitter 101 as well as a high-frequency transmitter/receiver 110.

The components of the sensor module 100 are disposed on carrier 20. The measuring element 30 which preferably is configured as an expansion measuring strip serves to detect tensions and expansions in the structural component. The carrier 20 can for example be configured as a metal sleeve consisting of a material which can transmit tensions from a structural component, and in which the components units are held in place with sealing compound.

The expansion measuring strip 30 is disposed on the carrier 20. Carrier 20 receives the tensions from the structural component of the machine-technical installation in the form of expansions. The microcontroller 40, which is built on a multi-layer ceramic module, sends out measuring impulses through which the expansions of carrier 20 are registered via the expansion measuring strip 30. The so measured values are stored, not in the form of single absolute values, but are assigned to a respective class, which was formed by the division of the nominal load range into a series of classes. The classification of the nominal load range is matched with the specific installation structural component to which the carrier 20 is connected. After it has been installed on the structural component of the installation, the sensor module 100 is adjusted, that is, the sensor module 100 is calibrated for the nominal tension range of the particular type of installation respectively, the structural component of the installation, so that by means of the nominal tensions recorded via the expansion measuring strip 30, the exterior impacting forces impacting upon the structural component can be exactly determined. To realize this, the device according to the present invention is being charged with a defined load and the value of this load transmitted to the sensor module 100 via the high-frequency transmitter/receiver 110.

During operation, the device according to the invention takes up measurements of current tensions or stress on the structural components of the installation. The so collected measurement values are stored in the microcontroller 40 and transmitted via the high-frequency antenna 90 integrated in the sensor module 100. For practical purposes, operation of the high-frequency antenna 90 can be in the frequency range of 2.45 GHz. Thereby, distinctly higher rates of transmission are realized as compared to low-frequency. This transmission follows after a prompt from the data processing unit 70 to the sensor module 100 given via a high frequency signal and transmitted via the high-frequency-sensor/receiver 110.

The recorded measurement values of the stress load from the structural component is represented as a load-to-time function over a long period of time requiring a large data storage space of several gigabytes. Thus, according to the present invention, in order for the recorded data to be stored in the limited storage of the senor module 1, respectively the microcontroller 4, a data reduction in the form of classifying the measured values is contemplated. There are basically different methods of classifications applicable to computations relating to the operational stability of an installation.

Figure 5:
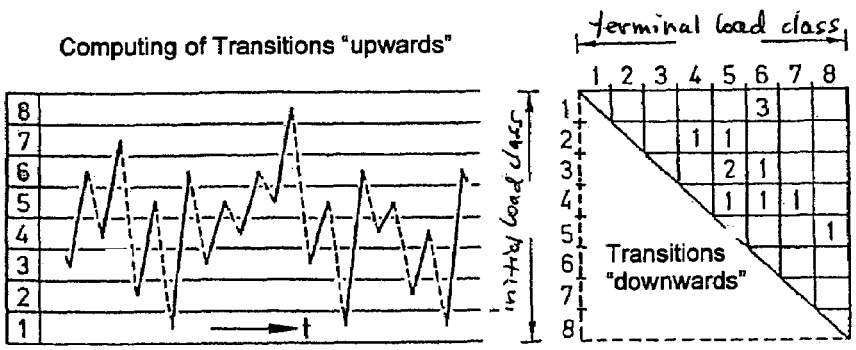
FIG. 5 is an example of a matrix-computation method showing exemplary values of measured data.

Each of the classification methods requires a division of a given nominal tension range into single classes, so that single stress events can be assigned to one class. It is within the scope of the invention that the sensor module 100 works according to the matrix-computation method which includes a classification into 16 classes. In the matrix-method, a two-dimensional matrix is created with the values of the measured component stresses filled in as also shown in FIG. 5. Hereby, the lines of the matrix correspond to the starting loads of a given stress and the columns of the matrix represent the target class in which the stress terminates.

In order to realize a further data reduction, only positive loads are stored in the storage of the sensor module 100. Positive loads in this context are defined as stress values of one class that are filed in the storage of the sensor module 100 in a class of stress that is higher by at least one level as shown in FIG. 5.

For an efficient utilization of energy supplied from the battery 60, the sensor module 100 can be put into standby mode. While in the so-defined stand-by mode, the sensor module 100 utilizes no energy from the battery 60. Via the low-frequency antenna 80 and through a corresponding signal, the sensor module can be turned on again by remote control.

In addition, a self-acting disconnect cycle is also included in the sensor module 100. In the state where the sensor module is activated, expansions in the component parts of the installation to be measure may be missed due to a certain clock frequency, for example at 3 Hz. If a measured component expansion within a certain pre-set tolerance does not change over a certain period of time, the clock signal will be successively lowered until the sensor module puts itself into the standby mode. This occurs for example in a situation where the installation to be monitored was not under operation over an extended period of time, so that no tensions or expansions were recorded at the structural component.

Reactivation of the sensor module 100 from the standby mode is carried out according to the present invention by means of a detector element 120. For example, as a detector element a piezosensor 120 which is integrated into the sensor module 100 can be utilized. During stand-by mode, the piezosensor 120 detects a change in the power initiation at the component of the installation and signals this to the microcontroller 40 of the sensor module 100 by means of a current pulse. This results in an immediate measurement and the sensor module 100 transitions into the normal operating mode. In standby mode, the piezosensor 120 uses only a small amount of energy form the battery 60.

The overall energy requirement of the sensor module 100 can thus be distinctly reduced which results in longer systematic periods of use of the sensor module 100. If it is ever necessary to exchange the sensor module 100 due to battery exhaustion, the intervals at which the exchange must be made are substantially longer as compared to the conventional devices, thus leading to an overall cost savings.

Figure 6:
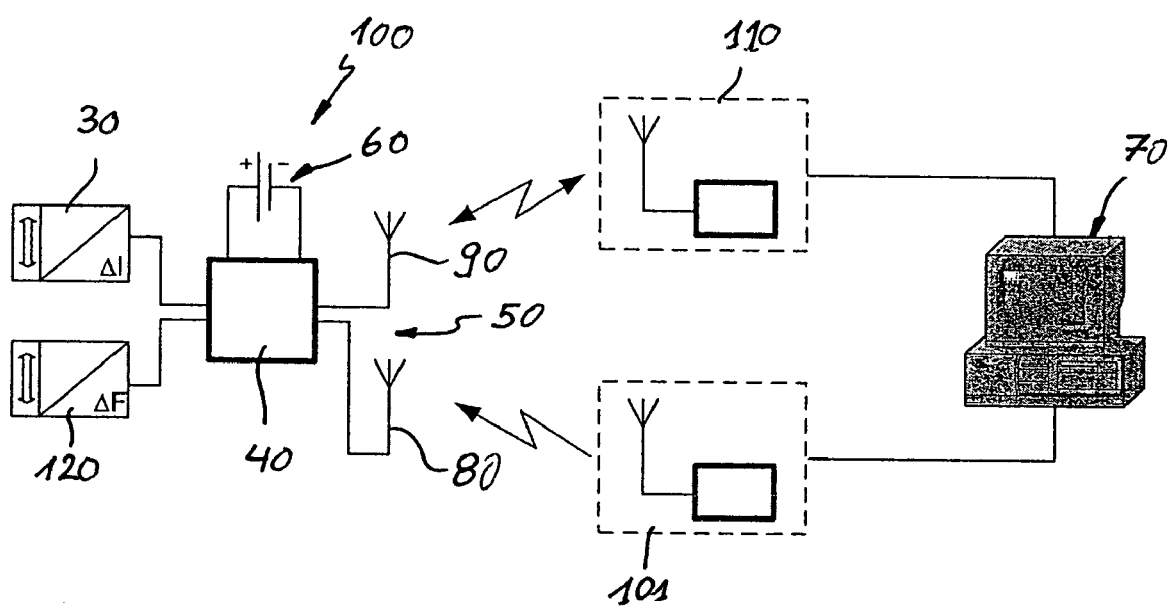
FIG. 6 is a schematic illustration of the device shown in FIG. 4 without a carrier.

The embodiment as shown in FIG. 6 differs from that in FIG. 4, in that the sensor module of this embodiment is configured for disposition directly at the structural component of the machine technical installation without the aid of a carrier. The sensor module which includes the measuring sensor 30 is thus directly applied to the installation, for example by gluing it to the installation.

Figure 7:
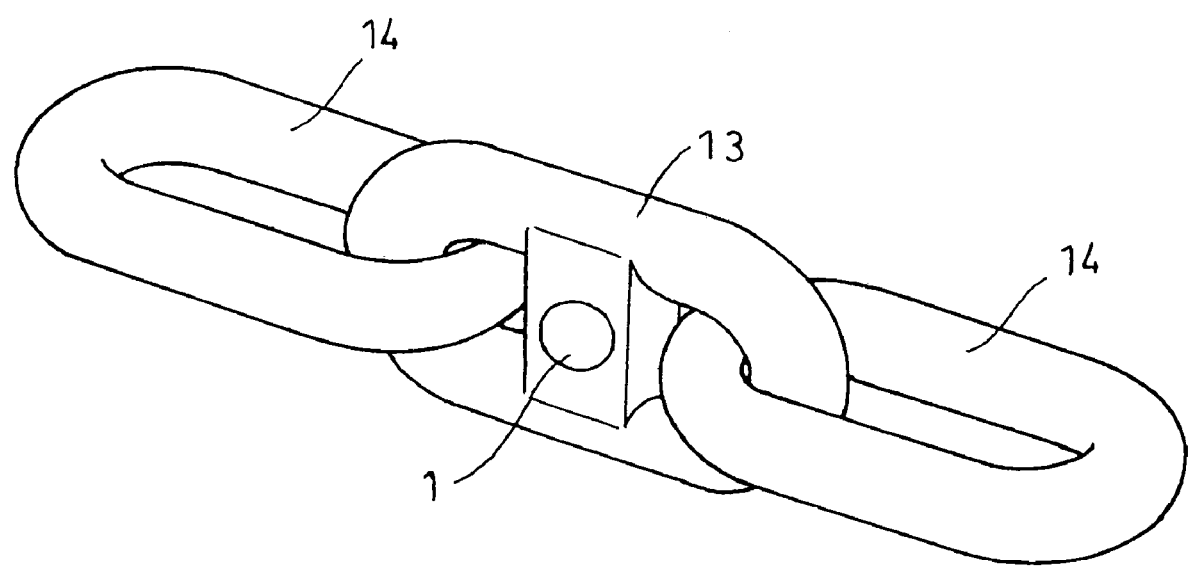
FIG. 7 shows a schematic view of the application of a service life sensor device as installed at a round steel link chain.

In FIG. 7, the device according to the present invention appears in connection with a conveyor chain, wherein a measuring chain member 13, which is a safety link, is shown as part of the conveyor chain 14. Several such safety links are incorporated into the chain in certain intervals. The measuring chain member 13 includes a web with a bore hole. The sensor module 1 is received within the bore hole. During operation, pulling forces are impacting upon the chain links leading to the deformation respectively compression of the web in the measuring chain member 13. The compression/deformation is transmitted to the sensor module 1 and by means of the DMS or SAW 9 detected via expansions of the sleeve 8. When the safety chain link 13 is relieved of the pulling forces, the web will return to its original shape, thereby bringing the sleeve 8 back to its starting position. The so recorded measurements are interpreted according to the matrix-computation method and are periodically transmitted to a reading unit at each completed chain cycle from where the data go to the data processing unit 7. The finally emerging data allow an evaluation on the current stresses of the structural component and the remaining service life of the installation.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A device for determining the serviceable life of a machine-technical installation comprising:
    a sensor module for disposition at a structural component of the machine-technical installation and including a measuring sensor for detecting and measuring tensions and expansions from the structural component, a micro controller, a data processing unit, an antenna arrangement integrated into the sensor module including high-freguency and low-freguency antennas, a detector element and a current source, wherein the sensor module is bi-directionally connected to the data processing unit and can transition from an operating mode to a stand-by mode, and wherein the detector element is provided for reactivation of the sensor module when the sensor module is in standby mode, wherein a low-frequency signal of 125 Hz can be received by a low-frequency communication channel for turning the sensor module on or off without use of the current source.

2. The device of claim 1, wherein the sensor module is connected with the data processing unit via a low-frequency transmitter and a high-frequency transmitter/receiver.

3. The device of claim 1, wherein the detector element is a piezosensor.

4. The device of claim 1, wherein the measuring sensor is an expansion measuring strip.

5. The device of claim 1 further comprising a carrier as part of the sensor module, wherein the carrier is from a material capable of transmitting tensions from the structural component.

6. The device of claim 1, wherein tensions detected from the structural component are evaluated by means of a matrix-computing method.

7. The device of claim 1, wherein the matrix-computing method includes a division into 16 classes for nominal tension loads associated with the structural component being monitored.

8. The device of claim 1, wherein the current source is a battery.

9. A method for monitoring the serviceable life of a machine-technical installation utilizing a sensor module comprising the steps of:
    applying a measuring element to a structural component of the machine-technical installation for uptake of stresses and tensions from the structural component in the form of expansions,
    calibrating the sensor module to establish a rated stress range for the particular type of structural component to be monitored,
    registering the expansions by means of an expansion measuring strip in the form of data and storing the data in the micro controller,
    conducting a data reduction in the micro controller by applying a two-dimensional matrix-computation method and classifying the tensions into 16 classes,
    transmitting the stored data via a high-frequency antenna integrated within the sensor module to a data processing unit for interpretation on the service life , wherein the sensor module is being turned on or off through receiving a low frequency signal of 125 Hz for turning the sensor module on or off without use of a current source.

* * * * *